United States Patent

Sommers et al.

[11] Patent Number: 4,541,407
[45] Date of Patent: Sep. 17, 1985

[54] COOKING STATION FOR GAS RANGES

[75] Inventors: Hans Sommers, Essen; Dieter Hanselmann, Mülheim, both of Fed. Rep. of Germany

[73] Assignee: Ruhrgas Aktiengesellschaft, Essen, Fed. Rep. of Germany

[21] Appl. No.: 314,500

[22] Filed: Oct. 23, 1981

[30] Foreign Application Priority Data

Oct. 23, 1980 [DE] Fed. Rep. of Germany ....... 3039982

[51] Int. Cl.[4] .......................... F24C 3/00; F24C 15/14
[52] U.S. Cl. .................... 126/39 E; 126/39 R; 126/214 A; 431/62; 431/328; 431/346; 431/354
[58] Field of Search ............. 431/200, 62, 354, 352, 431/344, 328, 198, 264, 343, 114, 346; 126/39 E, 214 D, 39 M, 26, 29, 51, 39 R, 214 A, 95, 262, 265, 266, 267, 37 R

[56] References Cited

U.S. PATENT DOCUMENTS

| | | | |
|---|---|---|---|
| 1,026,982 | 5/1912 | Hamilton | 431/346 X |
| 1,939,941 | 12/1933 | Ahern | 431/347 X |
| 1,942,265 | 1/1934 | Teller et al. | 126/214 A |
| 2,185,275 | 1/1940 | Sherman, II | 126/214 A |
| 2,320,754 | 6/1943 | Sherman | 126/214 A |
| 2,658,987 | 11/1953 | Ogden | 126/39 R X |
| 3,114,411 | 12/1963 | Dadas | 431/329 |
| 3,527,199 | 9/1970 | Perry et al. | 431/328 X |
| 3,675,905 | 7/1972 | Placek | 432/24 |
| 3,975,140 | 8/1976 | Placek | 431/329 |
| 4,020,821 | 5/1977 | Reid, Jr. et al. | 126/39 E |
| 4,201,184 | 5/1980 | Scheidler et al. | 126/214 A X |
| 4,243,176 | 1/1981 | Hays | 431/354 X |

FOREIGN PATENT DOCUMENTS

| | | | |
|---|---|---|---|
| 2730547 | 1/1979 | Fed. Rep. of Germany | 126/39 |
| 156808 | 5/1978 | Netherlands | 431/264 |
| 1544624 | 4/1979 | United Kingdom | 126/39 E |

Primary Examiner—Samuel Scott
Assistant Examiner—Kenichi Okuno
Attorney, Agent, or Firm—Beall Law Offices

[57] ABSTRACT

A cooking station for gas ranges whose burner works with super-stoichiometric combustion air premixing. The burner head arranged in a burner tray is connected with a mixing pipe via a ceramic insulating ring. Between the burner head bottom and the burner head lid with the flat topside, we have two perforated flame opening rings which are arranged concentrically with respect to the burner axis, which are resistant to heat and which are resistant to oxidizing and reducing atmospheres. The perforation of the inner flame-opening ring is so dimensioned that the flames cannot backfire. Below the burner tray there is arranged a reflector. The cooking station can be covered with a glass ceramics plate. The invention achieves stable flame performance, perfect combustion, and waste gas poor in harmful substances at nominal load and at small adjustment heat load within a vast utilization field of gases with differing Wobbe indexes as well as a start-up cooking efficiency improvement compared to known burners.

24 Claims, 3 Drawing Figures

COOKING STATION FOR GAS RANGES

BACKGROUND OF THE INVENTION

This invention relates to a cooking station for gas ranges whose burners are operated with super-stoichiometric combustion air free mixing, consisting of a burner head arranged in a burner tray or pan, a mixing pipe connected with the burner head, through which the gas and combustion air mixture is supplied to the burner head, and a gas nozzle arranged in front of the mixing pipe from which the gas jet comes out and suctions in the entire combustion air.

Currently customary cooking stations for gas ranges as a rule are equipped with injector burners which work with sub-stoichiometric primary air premixing. The additional secondary air necessary for complete combustion is diffused uncontrolled or unregulated into the flames forming at the mixture outlet openings in the burner head. This has a negative effect in the entire working area upon the efficiency of the burner, that is to say, the supplied heat energy is not used in an optimum fashion both in the nominal load and the partial load spread. Besides, the sub-stoichiometric premixing flame forms a comparatively large nitrogen oxide share in the waste gas which mostly escapes into the place where the equipment is set up. The so-called small adjustment heat load can also be improved. The heat load or stress on a cooking station burner is adjustable in a phaseless manner between a large position, that is to say the nominal heat load, and a minimum, small adjustment, the small adjustment heat load. According to the applicable standard, the latter may not exceed a certain part of the nominal heat load. This requirement is met by customary cooking station burners, but practical experience shows, especially in ranges operated with natural gas, that the small adjustment heat load is a point that is worthy of improvement.

Additional requirements for the cooking station burner are derived from the fact that natural gases with varying Wobbe index are being increasingly distributed in the Federal Republic of Germany which are combined in the so-called second gas family. Because gas change should be possible within a gas family, without making any changes on the burner, a cooking station burner must, within the largest possible operating spread of gases with varying Wobbe indexes, the so-called Wobbe index spread, meet the requirements regarding ignition, combustion quality, and flame stability especially in connection with the small adjustment heat load.

It is known from the technical literature that, by means of super-stoichiometric premixing, that is to say, by supplying the entire air involved in combustion to the burner through the mixing pipe, without secondary air admission to the flames, we can achieve a waste gas which is poor in harmful substances and we can at the same time achieve better energy utilization, especially in the partial load spread.

But no burner is known in which the problems, which appear on the basis of the large combustion air volumes, have been solved in design terms, especially regarding insufficient flame stability.

We do know of a cooking station whose burner works with super-stoichiometric primary air admixture, excluding secondary air admission to the flame. But the burner of this cooking station is very expensive in terms of design and construction because it has two separate nozzle mixing pipe devices for the formation of the gas and air mixture for a main flame and a holding flame or pilot flame.

Because the waste gases from this burner mostly flow to the outside through narrow grooves in the burner tray and mostly give heat off there to the bottom of the pot, there has been no efficiency increase to the degree expected.

The purpose of the invention is to create a cooking station in this category of equipment whose burner, with simple design means, will permit optimum utilization of the supplied heat energy both during nominal heat load and in the partial load spread. The burner should reveal good ignition, steady flame peformance, perfect combustion, and a waste gas poor in harmful substances at nominal and small adjustment heat loads within a large utilization spread of gases with differing Wobbe indexes.

This problem is solved according to the invention.

The object of the invention accordingly is a cooking station whose burner is operated with super-stoichiometric air premixing whereby the air number or coefficient, that is to say, the ratio between the combustion air supplied and the volume of air needed for complete combustion, is about 1.05 to 1.70.

The burner head according to the invention reveals two flame opening rings which are perforated, which are arranged concentrically with respect to the burner head axis, which are resistant to heat and reducing as well as oxidizing atmosphere, preferably made of aluminum containing and nickel-free chromium steel or ceramics, through which the gas and air mixture escapes and is ignited. The outlet openings on the inner flame opening ring have a hydraulic diameter of less than 1.2 millimeters, preferably 1.2 millimeters to 0.8 millimeters, whereas those on the outer flame opening ring have a diameter of more than 1.2 millimeters, preferably 1.2 millimeters to 3 millimeters.

In this way we achieve the following:

In the state of inertia or rest, which is obtained shortly after ignition, the flames burn on the inner flame opening ring. In the process they heat the outer flame opening ring so much that a metallic flame opening ring will begin to glow. The previously mentioned hydraulic diameters of the flame outlet openings on the one hand will prevent the flames burning on the inner ring from backfiring and on the other hand make sure that, if necessary, the flames burning initially on the outer ring, can backfire. Flame formation on the outer ring, that is to say, a "migration" of the flames from the inner to the outer ring, however, is not possible so long as the outer flame opening ring is still heated or glowing. The stability of the flames burning on the inner ring is particularly effectively guaranteed by the action of the hot or glowing outer flame ring.

When the cooking station is open, the burner head is embedded in a burner pan or tray which is so shaped that the speed of the waste gases flowing to the outside is substantially constant at all stations; this guarantees good heat transfer through convection to the bottom of the pot and the burner tray. The bottom of the pot is heated not only through convection but also through heat radiation which starts from the surface of the tray and from the outer flame opening ring.

The material or the wall thickness of the burner tray is so selected that it has only a small heat capacity and therefore stores only little heat, which has a good effect on the heating time of the pot.

Coating the burner tray underside with a material with low emission capacity and providing a reflector located below the burner tray prevents any major heat volumes from being irradiated or reflected down.

As supporting surfaces for the pot we have several carrying ribs attached to the burner tray as well as the burner head whose lid touches the pot. The direct cooling of the burner head by the pot standing on it has a favorable effect on the operation of the burner.

If the cooking station is covered by a cover plate according to the further version, then we get an improved cooking start efficiency compared to conventional gas range cooking stations.

By virtue of the super-stoichiometric air premixing, the burner of the cooking station according to the invention reveals all of these conditioned advantages, especially waste gas poor in harmful substances and efficiency improvement compared to known burners.

In spite of the large air volumes involved in combustion, we can, with simple design and construction means, achieve extremely stable flames in a large load spread so that, even when we have a low small adjustment heat load, we can get hygienically perfect combustion.

This applies to the use of all gases with various Wobbe indexes within a gas family.

BRIEF DESCRIPTION OF DRAWINGS

The cooking station according to the invention will now be described with the help of an example illustrated in the drawings:

In FIGS. 1 and 2 we have illustrated one of several cooking stations in a gas range.

DETAILED DESCRIPTION OF A PREFERRED EMBODIMENT

Figure 1:
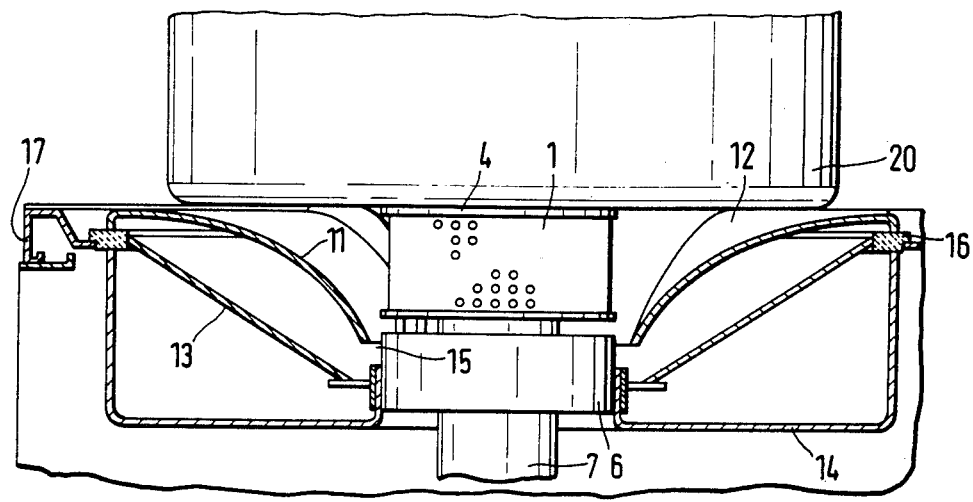
FIG. 1 shows a front view of an open cooking station in a cross section with the exception of the burner head.
Figure 2:
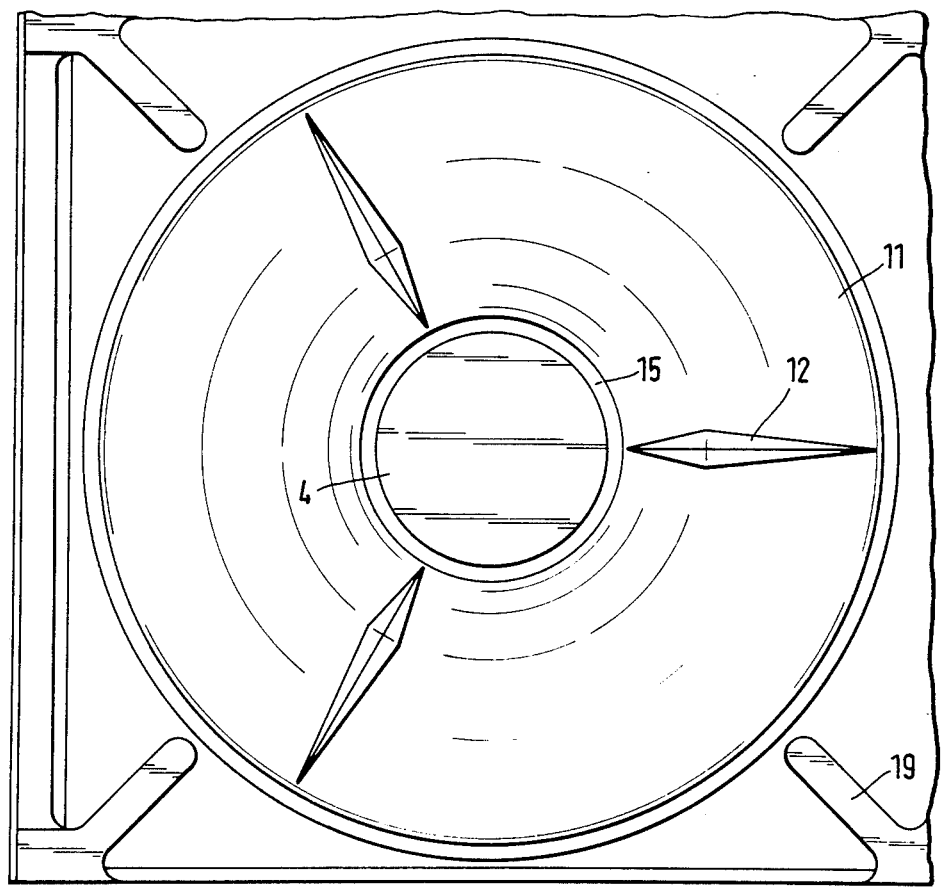
FIG. 2 shows a top view of the cooking station.

Burner head 1 is midway in a circular burner tray 11 which is recessed into the range tray plate 17. The burner tray is arched from the inside to the outside and reveals three radially arranged carrying ribs 12 whose topsides are on the same level with the topside of the burner head lid 4 and with the topside of other range carrying ribs 19, which are attached to the range tray plate 17 and thus form a support surface for the pot 20. With the help of the range carrying ribs 19 it is possible to push the pot without any problem away from the cooking station or to another one.

The burner tray 11 consists of noble steel plate with a thickness of about 0.5 millimeters, which is why it stores little heat and that has a favorable effect on the start-up heating time of the pot. It is furthermore advantageously provided on its underside with a thin aluminum coating. Because the emission capacity of aluminum is less than that of noble steel, we can make sure in this way that the heat absorbed by the burner tray will preferably be radiated upward, that is in the direction toward the bottom of the pot.

To prevent the radiation of heat down even further, there is arranged, below burner tray 11, in the trap tray 14, for any possible overflowing cooking material, a reflector 13 which extensively reflects the heat radiated downward from the burner tray 11 and which by virtue of its shape strongly prevents a convective heat transfer down.

The trap tray 14 which serves to receive possible overflowing cooking material which would flow down through the ring-shaped passage opening 15 in the burner tray, is together with burner tray 11 closed off air-tight and heat insulated with a sealing ring 16 with respect to the range tray plate 17.

In order extensively to prevent heat transfer from the burner head 1 to the mixing pipe 7, the burner head 1 is connected with the mixing pipe 7 via an insulating ring 6 consisting of ceramics.

The burner head 1 essentially consists of the perforated inner and outer flame opening rings 2 and 3 which are arranged between the burner head bottom 5 and the burner head lid 4. These flame opening rings consist of an aluminum containing and nickel-free chrome steel plate.

The entire combustion air is sucked in by the gas jet which comes out of gas nozzle 18. The gas and combustion air mixture, supplied to the burner head 1 through the mixing pipe 7 is ignited, whereby, in the state of steady operational condition, the flames burn on the inner flame opening ring 2 and continually further heat the outer flame opening ring 3 so that the latter will glow and radiate heat.

The two flame opening rings are covered from above by a flat burner head lid 4 so that no overflowing cooking material can get into or on the flame opening rings.

In the ring space between the inner and outer flame opening ring, we have arranged the ignition and ignition safety device 9, 10. As a result of this particularly protected placement, the danger of damage or contamination of these structural components is very small. The ignition device 9 is preferably made in the form of an ignition flame burner or pilot light.

Figure 3:
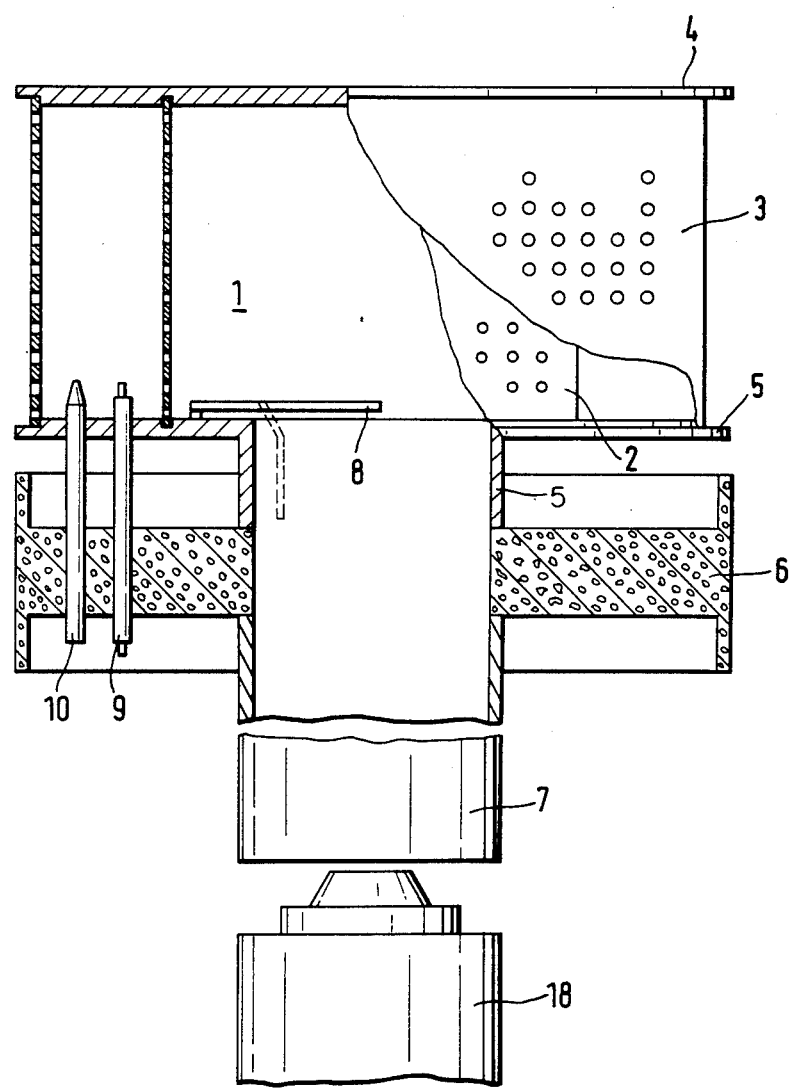
FIG. 3 shows the burner head in an enlarged illustration and with a partly perpendicular cross section.

At burner bottom 5 a bimetallic controlled cold starting flap 8 is so built in that, during the cold start-up when the burner is first turned on, the flap 8 will be in its solid line position of FIG. 3 so that an additional flow resistance will act against the gas and air mixture current so that the air number or coefficient during the start of burner operation will be roughly the same size as in the state of steady operational condition when the flap 8 would be in the dotted line position where it would have practically no affect upon the mixture. This guarantees perfect ignition of the super-stoichiometric gas and combustion air mixture.

The burner head lid 4, the flame opening rings 2 and 3, the burner tray 11, the reflector 13, and the trap tray 14 can be dismantled for cleaning purposes.

In a further version of the invention, not illustrated, the burner is covered by a radiation-permeable cover plate, preferably a glass ceramic plate. The plate is connected in a sealed manner with the range and covers all cooking stations. The burner corresponds to the version illustrated in FIG. 3. The burner tray is formed by a truncated cone-shaped reflector below which we have yet another reflector for the further reduction of the heat radiation aimed down. On its topside, the upper reflector reveals some spacing members for placement against the cover plate. The waste gas is evacuated to the rear with the help of waste gas guide sheets. The latter can be arranged in an exhaust or waste gas tray commonly shared by all cooking stations of a range and that tray is preferably lined with an insulating layer that reflects upward. According to the invention, the burner head is in contact with the cover plate. To assure this contact and to increase breakage safety, the entire cooking station, in other words, the burner including the reflectors, can be positioned in an elastic fashion. If a common waste gas tray is provided, it is likewise positioned elastically.

When the cooking station is covered, the use of a ceramic burner head lid and burner bottom is particularly advantageous because that prevents the danger of overheating of the inside burner space (exceeding the ignition temperature), such as can happen in connection with steel constructions due to heat conduction of hot burner outside surfaces to the gas cooled interior.

Experiments have shown that, due to the design according to the invention, the start-up cooking efficiency is extraordinarily high even when we have small pot diameters.

We claim:

1. A cooking station for gas ranges, whose burner is operating with super-stoichiometric combustion air premixing, comprising:
   a burner tray;
   a burner head arranged in said burner tray concentric with respect to a burner axis;
   a mixing pipe means operatively connected with the burner head for supplying a fuel gas and combustion air mixture to said burner head;
   gas nozzle means mounted at the inlet of said mixing pipe for discharging a fuel gas jet into the inlet of said mixing pipe to entrain a super-stoichiometric air volume;
   a ceramic insulating ring providing the connection between said mixing pipe and said burner head;
   said burner head including inner and outer perforated flame opening rings mounted concentrically with respect to each other and to said burner axis and constructed of heatresistant and oxidizing resistant material, a burner head bottom connecting one end of said rings, and a burner head lid having a flat topside and connecting the other end of said rings; and
   the perforations of said inner flame opening ring being so dimensioned that the flames between said rings cannot backfire through the perforations of said inner flame opening ring.

2. A cooking station according to claim 1, further including a radiation-permeable cover plate covering and in contact with the flat topside of said lid; said burner tray comprising a generally truncated cone-shaped reflector of corrosion-proof sheet metal; and an additional reflector mounted below said burner tray for reflecting heat emitted downwardly from said first reflector and for preventing heat transfer downwardly.

3. A cooking station according to claim 1, further including:
   means for providing a horizontal support plane that extends substantially coplanar with said flat top side of the burner head lid, said supporting means comprising a plurality of angularly spaced, radially elongated supporting ribs which extend from said burner tray upwardly to said support plane, said burner tray comprising a corrosion-proof sheet metal ring having an inner edge defining an opening for receiving therethrough said burner head and leaving an open space therebetween for draining off any possible overflow cooking material, said sheet metal ring having a trumpet like upwardly widened shape so that said burner tray from said inner edge spaced below said support plane continuously appproaches said support plane;
   a trap tray disposed below said burner tray for trapping said overflow cooking material flowing through said burner tray opening; and
   a reflector means mounted between said burner tray and said trap tray.

4. The cooking station according to claim 3, wherein said angularly spaced, radially elongated supporting ribs are integrally formed with and vertically projecting from said burner tray.

5. A cooking station according to any one of claims 1-3, wherein the through-flow diameter of the outlet openings constituting the perforations of the inner flame opening ring is less than 1.2 mm and the through-flow diameter of the outlet openings constituting the perforation of the outer flame opening ring is more than 1.2 mm.

6. The cooking station according to claim 5, wherein the diameter of the inner flame opening ring perforations is preferably within the range of 0.8 mm to 1.2 mm and the diameter of the perforations for the outer flame-opening ring is within the range of 1.2 mm to 3.0 mm.

7. A cooking station according to any one of claims 1-3, wherein each of the flame-opening rings is constructed of an aluminum containing, nickel-free chrome steel alloy.

8. A cooking station according to any one of claims 1-3, wherein each of said flame-opening rings is constructed of ceramic.

9. A cooking station according to any one of claims 1-3, wherein said burner head topside is constructed of ceramic.

10. The cooking station according to claim 9, wherein said burner head bottom is constructed of ceramic.

11. The cooking station according to claim 10, wherein said burner head bottom is integrally formed with said ceramic insulating ring.

12. The cooking station according to any one of claims 1-3, further including ignition means mounted within the annular space between said inner and outer flame-opening rings.

13. The cooking station according to any one of claims 1-3, further including a thermally actuated adjustment means comprising flap means adapted to reduce the mixture flow from said mixture tube to the interior of said inner flameopening ring for reducing the air number during the starting period of burner operation.

14. The cooking station according to any one of claims 1-3, wherein the burner tray is constructed of high-grade steel sheet metal having a thickness less than 1 mm, preferably less than 0.5 mm.

15. The cooking station according to any one of claims 1-3, wherein the burner tray is constructed of enameled-steel sheet metal having a thickness less than 1 mm, preferably less than 0.5 mm.

16. The cooking station according to any one of claims 1-3, wherein said burner tray is provided on its side opposite from said burner head with a coating having a lower radiation emission than the sheet metal of which the burner tray is made.

17. The cooking station according to claim 16, wherein said coating is made of aluminum.

18. A cooking station for gas ranges whose burner is operating with super-stoichiometric combustion air premixing, comprising:

a burner tray;

a radiant burner head arranged in said burner tray concentric with respect to a burner axis;

said burner tray being provided on its side opposite from said burner head with a coating having a lower radiation emission than the material of which the burner tray is made;

a mixing pipe means operatively connected with the burner head for supplying all of the fuel gas and combustion air mixture to said burner head;

gas nozzle means mounted at the inlet of said mixing pipe for discharging a fuel gas jet into the inlet of said mixing pipe to entrain a super stoichiometric air volume;

said burner tray comprising a generally truncated cone-shaped first reflector of corrosion-proof sheet metal being mounted around said radiant burner head so that heat radiated radially outward and downward from said radiant burner head will be reflected upward;

an additional generally truncated cone-shaped second reflector spaced below the entirety of said burner tray for upwardly reflecting substantially all heat radiantly emitted downwardly from said first reflector; and sealing means, including said reflectors for preventing flow of secondary air and preventing heat transfer by convection.

19. A cooking station according to claim 18, further including:

said first reflector including means for providing a horizontal support plane that extends substantially coplanar with the top of said burner head, said supporting means comprising a plurality of angularly spaced, radially elongated deformed sheet metal portions of the first reflector sheet metal forming supporting ribs which extend integrally in one piece upwardly to said support plane, said burner tray having an inner edge defining an opening for receiving therethrough said burner head and leaving an annular open space therebetween for draining off any possible overflow cooking material, said burner tray having an upwardly arched widened shape so that said burner tray from said inner edge spaced below said support plane continuously approaches said support plane; and a trap tray disposed below said burner tray and said second reflector for trapping said overflow cooking material flowing through said burner tray opening.

20. The cooking station according to claim 18, wherein said coating is made of aluminum.

21. The cooking station according to any one of claims 18 and 19, wherein the burner tray is constructed of high-grade steel sheet metal having a thickness less than 1 mm, preferably less than 0.5 mm.

22. The cooking station according to any one of claims 18 and 19, wherein the burner tray is constructed of enameled-steel sheet metal having a thickness less than 1 mm, preferably less than 0.5 mm.

23. A cooking station for gas ranges, comprising:

a burner tray;

a burner head arranged in said burner tray concentric with respect to a burner axis;

a mixing pipe means operatively connected with the burner head for supplying a fuel gas and combustion air mixture to said burner head;

gas nozzle means mounted at the inlet of said mixing pipe for discharging a fuel gas jet into the inlet of said mixing pipe to entrain an air volume;

said burner tray comprising a generally truncated coneshaped first reflector of corrosion-proof sheet metal;

an additional generally truncated cone-shaped second reflector spaced below said burner tray for reflecting heat emitted downwardly from said first reflector, and for preventing heat transfer by convection downwardly; and said burner tray being provided on its side opposite from said burner head with a coating having a lower radiation emmission than the material of which the burner tray is made.

24. The cooking station according to claim 23, wherein said coating is made of aluminum.

* * * * *